UNITED STATES PATENT OFFICE.

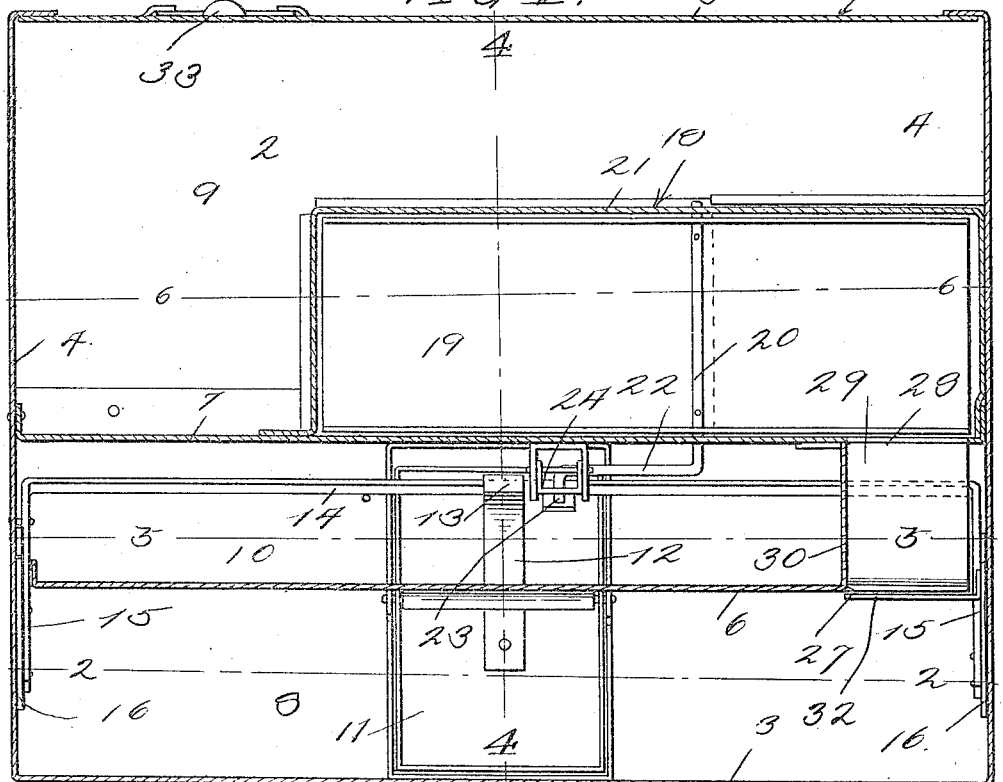

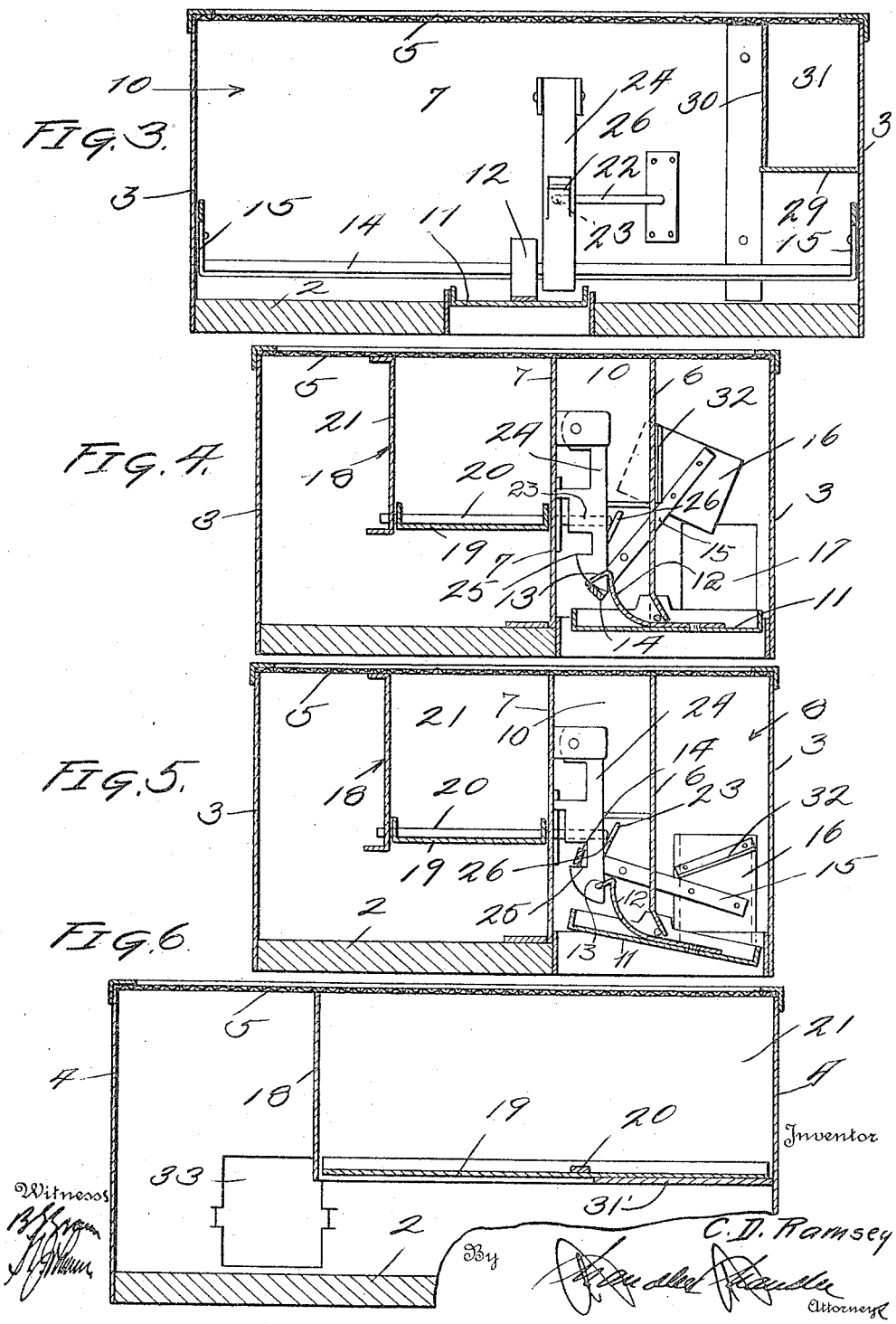

CHARLES D. RAMSEY, OF SEDALIA, TENNESSEE.

RAT-TRAP.

1,222,795.

Specification of Letters Patent. Patented Apr. 17, 1917.

Application filed September 14, 1916. Serial No. 120,136.

*To all whom it may concern:*

Be it known that I, CHARLES D. RAMSEY, a citizen of the United States, residing at Sedalia, in the county of Hancock, State of Tennessee, have invented certain new and useful Improvements in Rat-Traps; and I do hereby declare the following to be a full, clear, and exact description of the invention, such as will enable others skilled in the art to which it appertains to make and use the same.

The present invention is directed to improvements in rat traps, and has for its object to so construct a device of this character that the same will actuate after trapping one animal to reset the device for trapping other animals.

A further object of the invention is to provide a device of this character so constructed that when the animal passes from the entrance compartment to the trapping compartment the doors which have previously closed the entrance openings to the entrance compartment will be opened so that other animals can enter the entrance compartment.

With these and other objects in view, this invention resides in the novel features of construction, formation, combination and arrangement of parts to be hereinafter more fully described, claimed and illustrated in the accompanying drawing, in which:—

Figure 1 is a top plan view of the trap with the wire cover removed.

Fig. 2 is a sectional view on line 2—2 of Fig. 1.

Fig. 3 is a sectional view on line 3—3 of Fig. 1.

Fig. 4 is a sectional view on line 4—4 of Fig. 1.

Fig. 5 is a sectional view similar to Fig. 4 showing the parts in another position.

Fig. 6 is a sectional view on line 6—6 of Fig. 1.

The trap comprises a housing 1, which is provided with a bottom 2, said bottom being formed from wood, while the side and end walls 3 and 4, respectively, are preferably formed from sheet metal. The bottom can be formed from metal, if desired. The upper edges of the walls 3 and 4 support the wire mesh cover 5.

Arranged longitudinally of the housing 1 are vertical partitions 6 and 7, said partitions being spaced from the adjacent walls 3 so as to provide an entrance chamber 8 and a trapping chamber 9. The partitions 6 and 7 are spaced from each other to provide a compartment 10.

A tilting table 11 is supported by the bottom 2, and is disposed transversely of the chamber 8 and compartment 10, said table having an arm 12 carried thereby, and provided with a hook 13, the purpose of which will appear later.

A bar 14 extends longitudinally of the compartment 10, and has its ends terminating in right angle arms 15, said arms being pivotally connected to the ends 3 of the housing. Fixed to the arms 15 are doors 16, which are adapted, when an animal is in the chamber 8, to close the openings 17 formed in the ends 3. It is through these openings that the animals pass into the chamber 8.

A casing 18 is supported by the partition 7, and has its lower end closed by a tilting platform 19, said platform being supported by a rock shaft 20, said shaft being journaled in the partition 7 and side wall 21 of the casing 18. The shaft 20 has one end terminating in a crank arm 22, said arm having a lateral projection 23 carried thereby, the purpose of which will later appear.

Located in the chamber 10 is a latch 24, which has its upper end pivotally connected with the partition 7, said latch being provided with a hook 25. The latch is further provided with an inclined lip 26 adapted to be engaged by the projection 23.

The partition 6 is provided with an opening 27, which registers with an opening 28 formed in the wall 21 of the casing 18, and connecting these openings is a floor 29, which has rising from its inner edge a wall 30, said wall forming in conjunction with the adjacent end wall 3, a passage 31, whereby the animal can pass from the chamber 8 into the casing 18. The outer end of the platform 19 is supported by a shelf 31' so the animal will first step on the supported end of the platform when entering the casing 18. Since the opening 27 is closed by the plate 32 carried by the adjacent door 16, the animal will then pass to the unsupported end of the platform 19, whereupon the tilting of the platform will precipitate the animal into the trapping chamber 9. The trapped animals can be removed from the trap by lifting the top 5, or can be taken through the door 33.

Assuming that the parts are in the positions as shown in Fig. 3, an animal after entering the chamber 8 will step upon the table 11, thus releasing the hook 13 from the bar 14, whereupon the bar will swing upwardly so that the doors 16 will swing downwardly and close the opening 17. The hook 25 of the latch 24 will then engage the bar 14 and hold the doors 16 positively closed, as shown in Fig. 5 of the drawing. After the animal has passed through the passage 31, and tilts the platform 19 the shaft 20 will be rocked, thus causing the projection 23 to engage the lip 26, thereby swinging the latch 24 so that the hook 25 thereof will release the bar 14, and as the projection moves downwardly it will engage the bar and force the same downwardly until engaged with the hook 13, and the trap will be again in its set position.

It will be of course understood that the trap can be used for catching any kind of animals, it being only necessary to change the proportions of the parts.

What is claimed is:—

A trap comprising a housing, partitions extending longitudinally of the housing for dividing the same into an entrance chamber and a trapping chamber, a passage affording communication between said chambers, a tiltable table located within the entrance chamber, a latch mounted in the housing, a casing located within the trapping chamber, a platform mounted within the casing, a shaft fixed to the platform and having a crank arm carried thereby, a bar pivotally mounted in the housing, said bar having arms carried by its ends, doors carried by the arms, the ends of the casing having openings formed therein, said doors being adapted to close the opening when the bar is engaged by the latch, said latch being disengaged from the bar when the platform is tilted, and means carried by the table for engaging the bar to hold the doors in their open positions.

In testimony whereof, I affix my signature, in the presence of two witnesses.

CHARLES D. RAMSEY.

Witnesses:
W. A. RAMSEY,
MOSSIE M. LOUTHEN.